Dec. 10, 1968 C. A. LINDBERG, JR 3,416,150
MAGNETIC RECORDING DISC CARTRIDGE
Filed Aug. 2, 1965 11 Sheets-Sheet 1
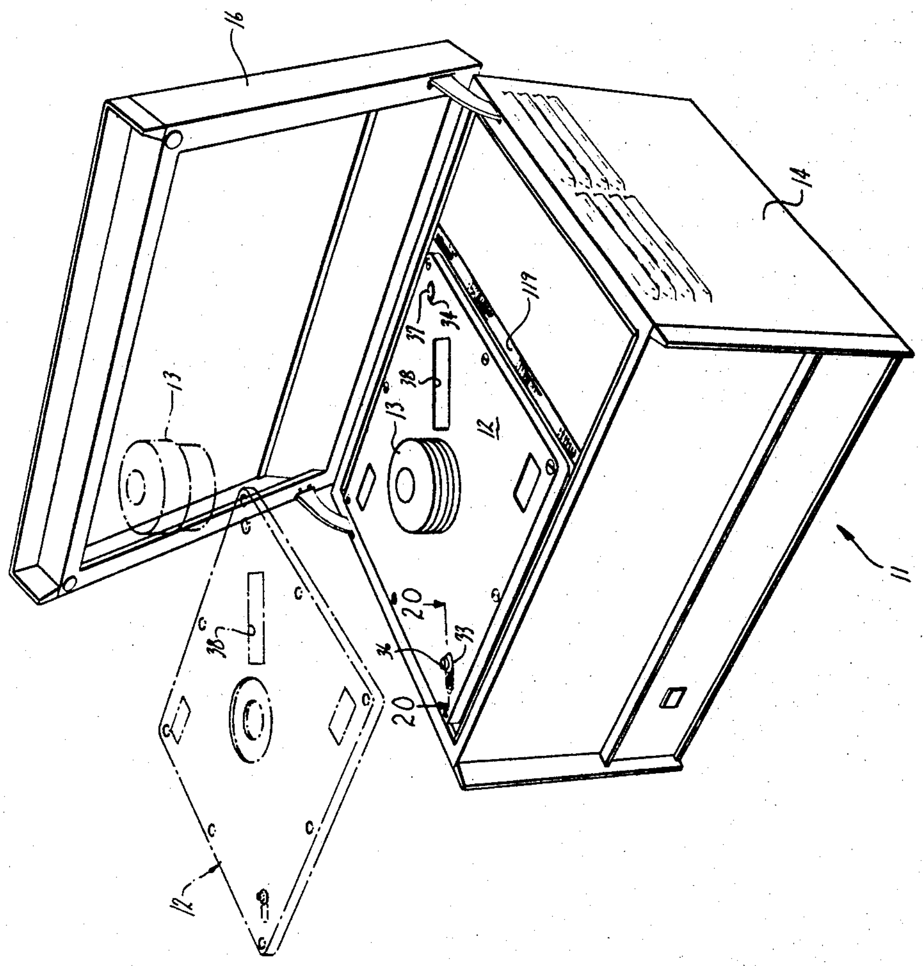
Fig. I
INVENTOR
Charles A. Lindberg, Jr.
BY [signature]
Attorneys Dec. 10, 1968 C. A. LINDBERG, JR 3,416,150

MAGNETIC RECORDING DISC CARTRIDGE

Filed Aug. 2, 1965 11 Sheets-Sheet 2

INVENTOR.
Charles A. Lindberg, Jr.
BY [signature]
Attorneys

INVENTOR.
Charles A. Lindberg, Jr.
BY
Flehr and Swain
Attorneys

INVENTOR.
Charles A. Lindberg, Jr.
BY [signature]
Attorneys

MAGNETIC RECORDING DISC CARTRIDGE

Filed Aug. 2, 1965 11 Sheets-Sheet 5

INVENTOR.
Charles A. Lindberg, Jr.
BY Fleh, McSwain
Attorneys

MAGNETIC RECORDING DISC CARTRIDGE

Filed Aug. 2, 1965 11 Sheets-Sheet 6

INVENTOR.
Charles A. Lindberg, Jr.
BY Flehr & Swain
Attorneys

INVENTOR.
Charles A. Lindberg, Jr.
BY Flehr and Swain
Attorneys

Dec. 10, 1968 C. A. LINDBERG, JR 3,416,150

MAGNETIC RECORDING DISC CARTRIDGE

Filed Aug. 2, 1965 11 Sheets-Sheet 8

INVENTOR.
Charles A. Lindberg, Jr.
BY
Flehr and Swain
Attorneys

MAGNETIC RECORDING DISC CARTRIDGE

Filed Aug. 2, 1965 11 Sheets-Sheet 9

INVENTOR.
Charles A. Lindberg, Jr.
BY Fehr and Swain
Attorneys

INVENTOR.
Charles A. Lindberg, Jr.
BY Flehr and Swain
Attorneys

INVENTOR
Charles A. Lindberg, Jr.
BY [signature]
Attorneys

United States Patent Office 3,416,150
Patented Dec. 10, 1968

3,416,150

MAGNETIC RECORDING DISC CARTRIDGE

Charles A. Lindberg, Jr., Menlo Park, Calif., assignor to Data Disc Incorporated, Palo Alto, Calif., a corporation of California Filed Aug. 2, 1965, Ser. No. 476,618
16 Claims. (Cl. 340—174.1)

ABSTRACT OF THE DISCLOSURE

A magnetic recording cartridge employing a rotatable magnetic recording disc normally held stationary within the cartridge until disposed in playing position upon playing apparatus. Dust seals and movable shutters seal the interior of the cartridge enclosure and are released upon lodging the cartridge in playing position. Protection against inadvertent recording is included by means of a readily removable token carried by the cartridge housing. A filtered air stream, maintained to flow through the interior of the cartridge, carries contaminates therefrom.

This invention relates to magnetic recording apparatus of a type characterized by a cartridge employing a rotatable magnetic recording disc therein. The apparatus is particularly useful as an information storage unit.

It is a general object of the present invention to provide an improved magnetic recording apparatus of a type characterized by a cartridge construction associated therewith.

An object of the invention is to provide an improved disc cartridge, primarily useful in cooperation with magnetic recording apparatus employing a magnetic recording transducer for recording or reading from the magnetic recording disc within the cartridge.

Another object of the invention is the provision of a magnetic recording cartridge wherein the rotatable magnetic disc therein is maintained in a controlled environment so as to protect it from contamination.

In magnetic recording, and particularly with respect to magnetic recording techniques employing recorded bits of data as entailed in computer usage, it has been consistently an object to pack more and more bits of information into a given length of each record path. Accordingly, the "density" with which data bits can be recorded upon magnetic recording surfaces has long been under improvement to a point where the packing of data bits is now quite dense, with very little spacing between bits. It should be further understood that if the disc surface is imperfect in virtually any respect whereby one or more of these tiny data bits might be lost or might fail to be recorded, information gleaned from such disc will thereafter be inaccurate and the disc will, without taking countermeasures, be essentially useless.

Thus, where the magnetic recording apparatus is to be employed with data processing equipment relying upon discrete data bits packed at extremely high density, there is a responsibility to insure that the record surface of the magnetic recording medium is maintained protected against the deleterious action of contaminants in its environment.

According to the present invention, there is provided a cartridge which cooperates with magnetic recording apparatus wherein a rotatable recording disc is contained within an envelope arranged in a surrounding protective relative thereto.

The cartridge construction is invertible whereby either side of the recording disc can be disposed in cooperative relation with a magnetic recording transducer carried by the disc handler or player.

As disclosed herein a readily removable control element is disposed in association with the cartridge whereby the writing or recording mode of operation of the transducer of the player can be inhibited so as to form a lock-out whereby the transducer cannot accidentally record or "write" upon previously recorded information carried by the disc. As is known, the recording of information magnetically upon a previously recorded magnetic surface serves to erase the pre-recorded information and accordingly the write lock-out control element carried by the cartridge herein serves to protect such prior information from destruction.

It is, therefore, an other object of the invention to provide a magnetic recording disc cartridge which carries a write lock-out control element adapted to cooperate with switch means carried by the cartridge player.

In the handling of the cartridge as disclosed herein, means are further provided whereby the disc is firmly held midway between the inside surfaces of the envelope which surrounds the disc. When the cartridge is placed in cooperative relation with the playing deck of the player, the disc is released for rotation within its envelope and is then concentrically aligned with the rotating spindle of the player.

Accordingly, another object of the invention is the provision of an information storage cartridge wherein the recording disc is held firmly therein during times when the cartridge is being handled and which serve to release the disc for rotation when the cartridge is placed into operation.

The foregoing and other objects of the invention will become more readily apparent from the following detailed description of a preferred embodiment of the invention when considered in conjunction with the drawings in which:

FIGURE 1 is a perspective view of apparatus according to the invention showing a disc cartridge associated with a disc player;

Figures 11, 12:
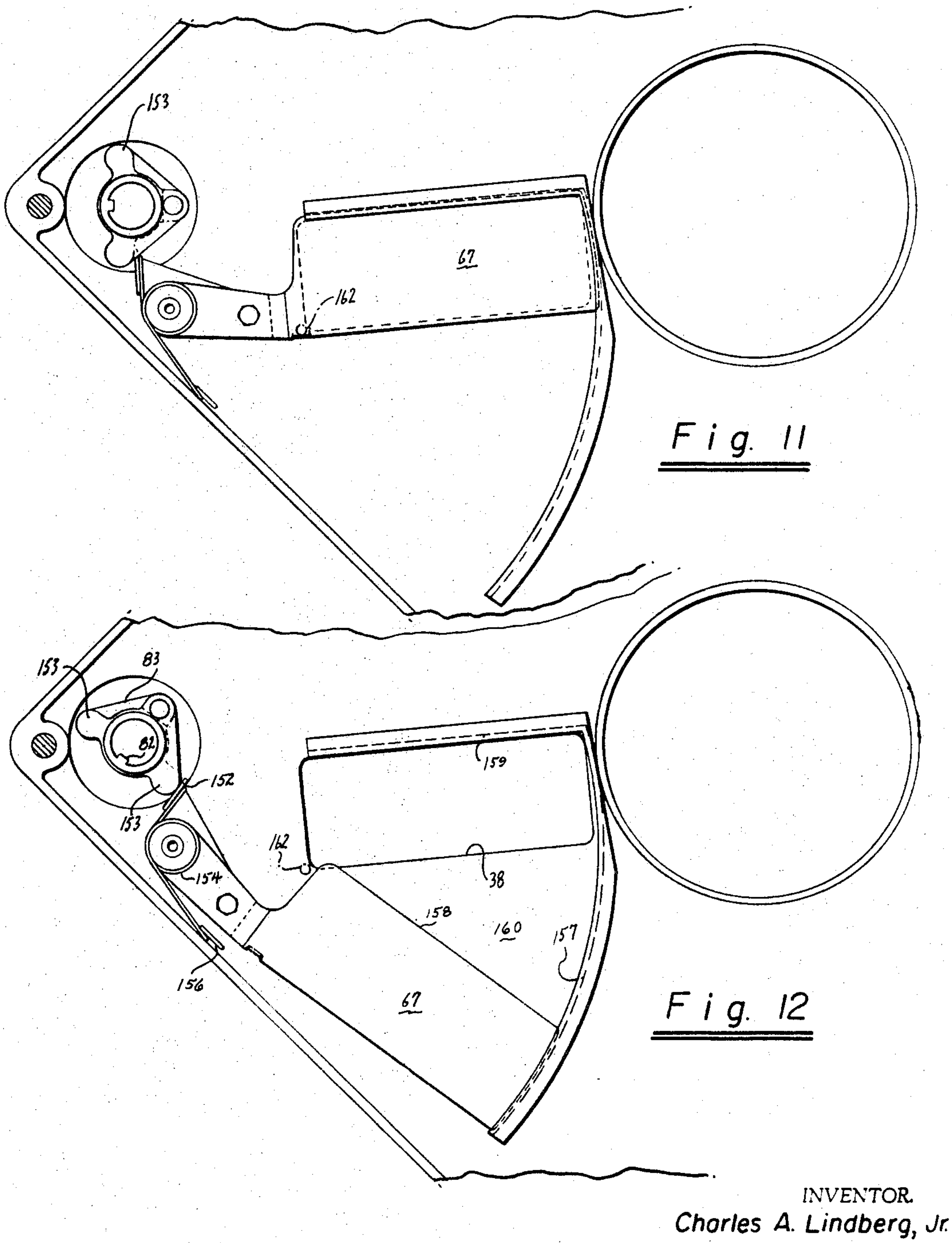
Figures 13, 14, 15:
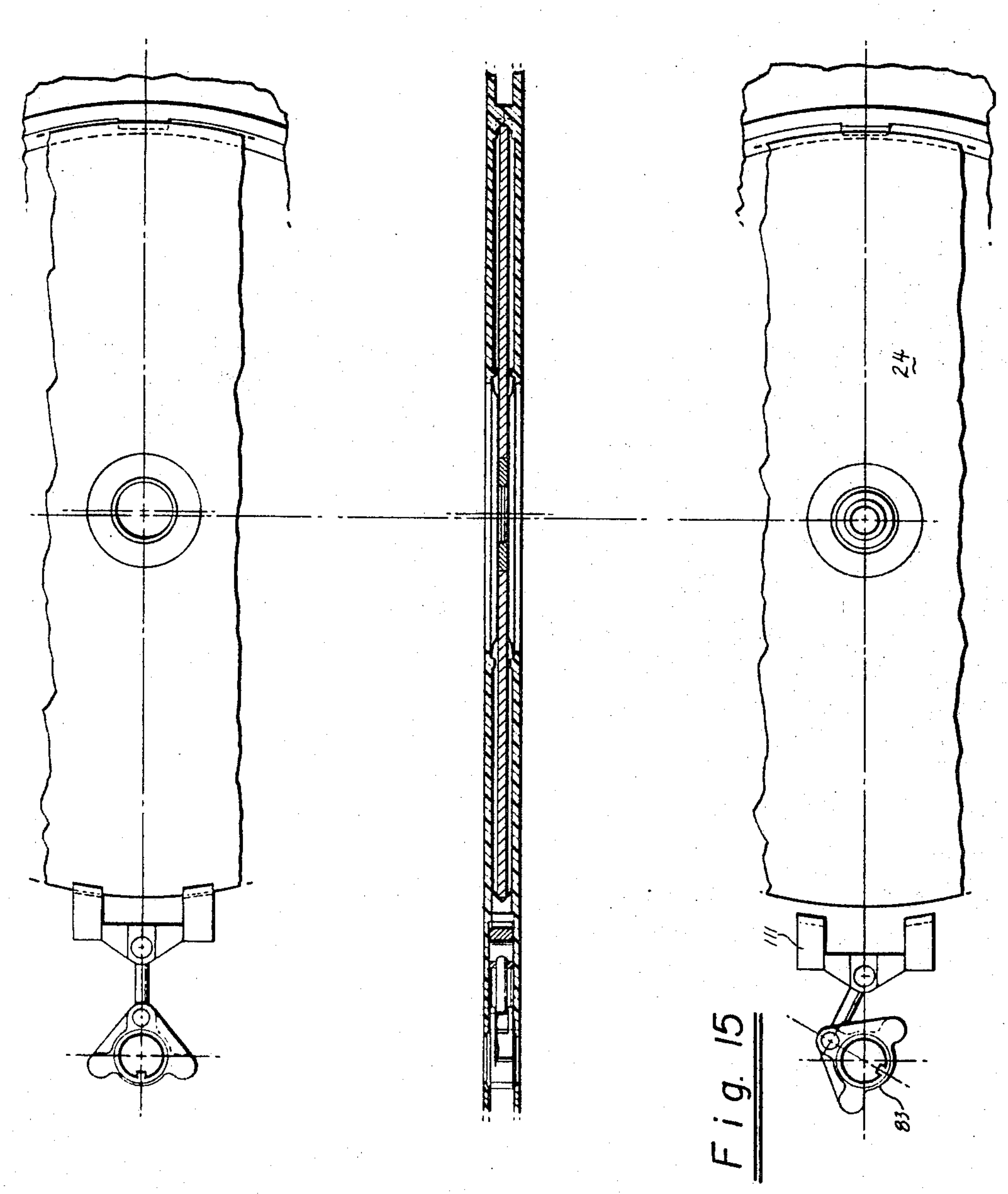
Figure 19:
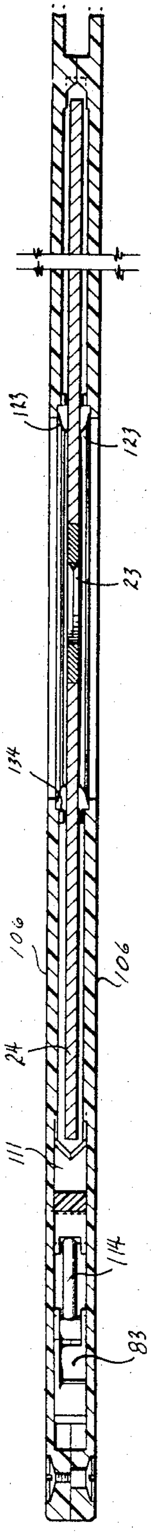
Figure 16:
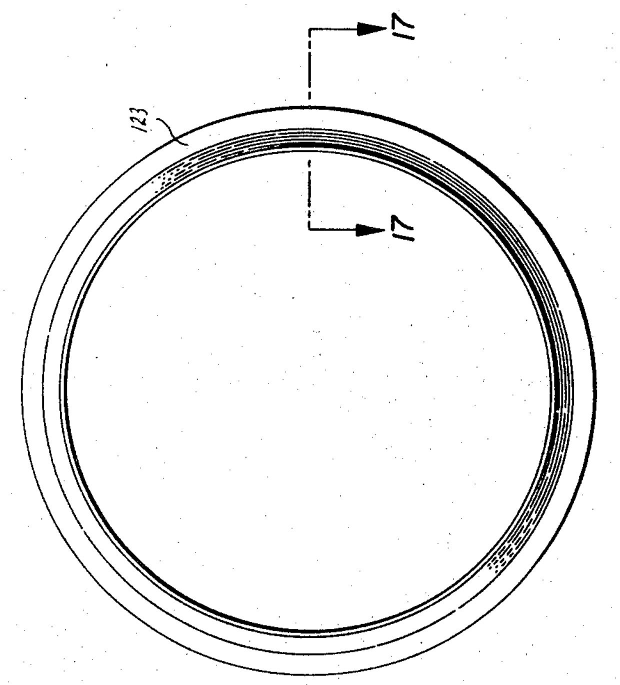
Figure 18:
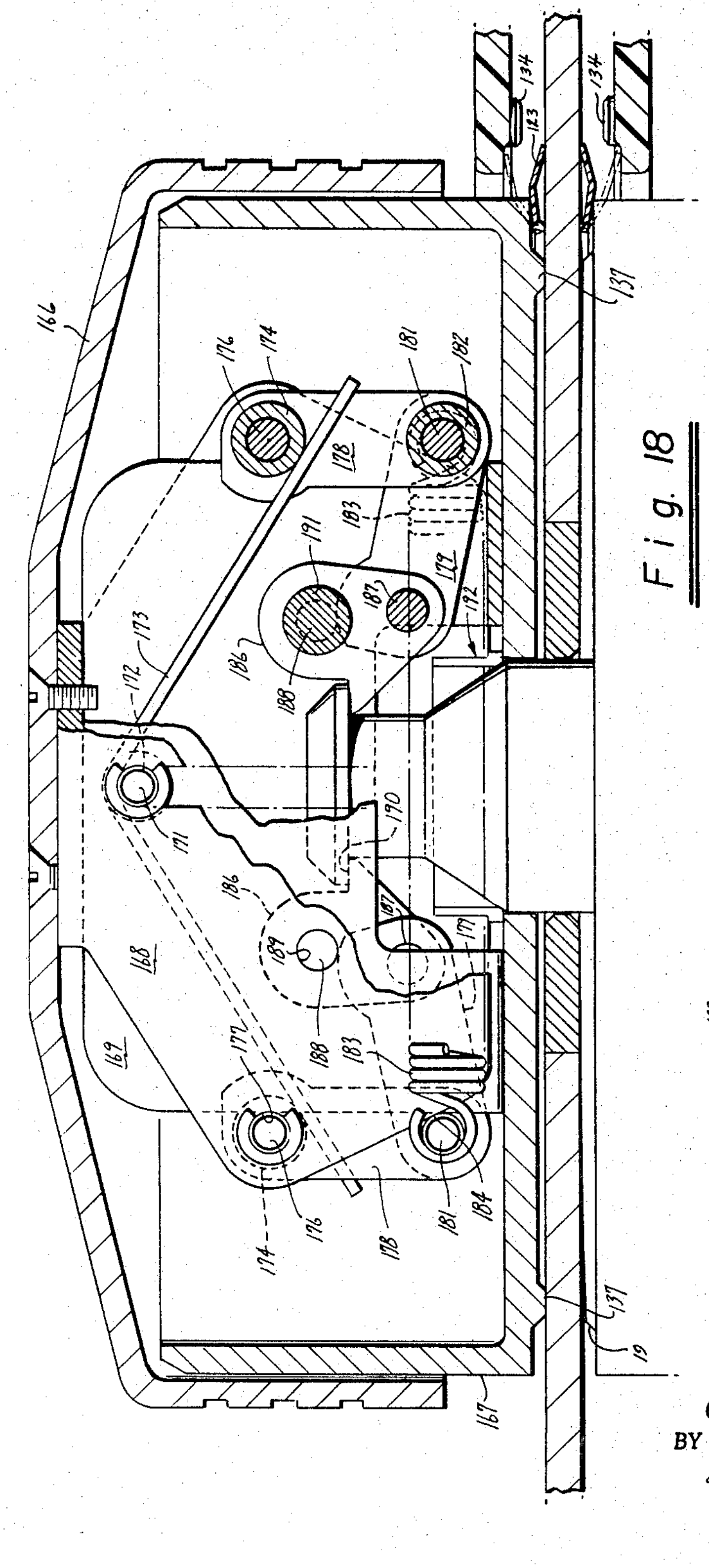
Figure 17:
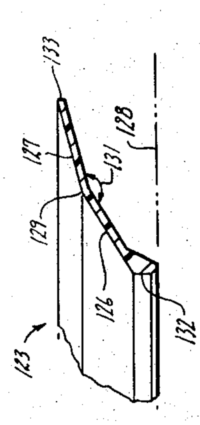

FIGURES 11 and 12 respectively show enlarged plan detail operational views of the shutter assembly of the cartridge;

FIGURE 13 is a plan operational detail view of gripping means in engagement with the disc edges;

FIGURE 14 is an elevation section view of FIGURE 13;

FIGURE 15 is a plan view similar to FIGURE 13 showing the disc in its released condition;

FIGURE 16 is a plan view of a sealing element employed in the cartridge;

FIGURE 17 is an enlarged elevation detail view in section taken along the line 17—17 of FIGURE 16;

FIGURE 18 is an enlarged elevation section view showing a hold-down knob assembly in operative position;

FIGURE 19 is an elevation section of FIGURE 15; and

Figure 20:
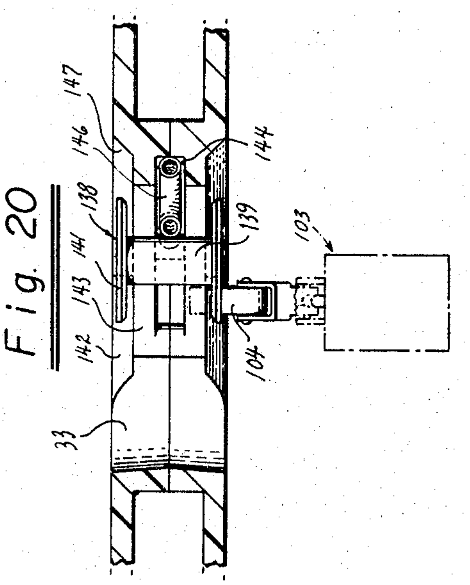

FIGURE 20 is an enlarged detail section taken along line 20—20 of FIGURE 1 showing operation of a control element carried by the cartridge.

The general arrangement of the apparatus as described in detail further below is shown in FIGURE 1. Generally, a magnetic disc player 11 is adapted to cooperate with and employ a magnetic disc cartridge 12 containing a magnetic disc therein. The disc is held in driving relation to a spindle assembly 18 of the player by a hold down knob 13.

First, the player apparatus will be described whereby the cooperation and utilization of the cartridge construction will be more readily understood.

Player 11, in general, includes a cabinet 14 provided with a movable lid 16 which can be raised in order to place cartridge 12 in operative position upon a playing deck 17. Deck 17 includes a drive spindle assembly 18 including a drum 27 adapted to be rotated by a motor 15 located beneath deck 17.

A brake shoe 20, carried on the end of a spring loaded lever arm 30, rides against the side of drum 27 and is movable thereagainst for braking the drum under control of solenoid 35 (beneath deck 17). An air seal 40 accommodates a downwardly extending coupling at the end of arm 30.

Spindle assembly 18 is characterized by an annular rib 19 adapted, as will later be seen, to press against the underside of a rotating magnetic disc 24 carried within cartridge 12. Spindle assembly 18 is further characterized by the upwardly projecting alignment spindle 21 formed to include a frusto-conical centering surface 22 adapted to cooperate with a corresponding surface 23 of magnetic recording disc 24 carried by the cartridge. At the upper end of alignment spindle 21, an umbrella shaped portion or annular flange has been formed to cooperate with hold down knob assembly 13 as described in detail further below whereby application of knob assembly 13 to spindle assembly 18 serves to draw disc 24 downwardly to grip the disc 24 between knob 13 and assembly 18 in driving relation.

Means are provided for driving spindle assembly 18 including an endless belt 26 trained around a groove formed in the drum 27 of spindle assembly 18. Belt 26 is also trained about a drive pulley 28 mounted on the upwardly extending motor shaft of motor 15 secured to the underside of the support base 50 journalled in playing deck 17. The lower end of the pulley shaft for pulley 28 is coupled to the drive motor 15 (mounted beneath deck 17).

Playing deck 17 further includes a transducer passage 29 covered by a pair of protective doors 31 whereby when the doors are moved laterally to the side, a transducer assembly 32 is exposed whereby it can cooperate with the underside of disc 24 as described in detail further below.

Cartridge 12 includes a pair of alignment openings 33, 34 formed at diagonally opposite corners of the cartridge. Openings 33, 34 cooperate with and are adapted to be disposed upon upwardly extending mounting post assemblies 36, 37 whereby that one of the two access openings 38 located on the underside of cartridge 12 can be registered with transducer passage 29 so that upon opening of the doors 31 transducer assembly 32 is disposed for cooperation with the underside of disc 24.

Figure 7:
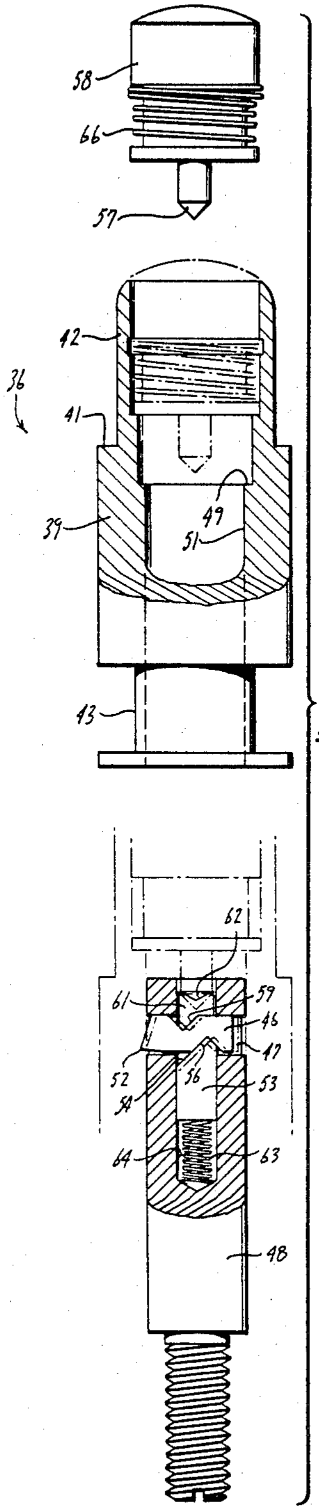
FIGURE 7 is an enlarged exploded detail view broken away in section showing one of the mounting post assemblies of the player.
Figure 9:
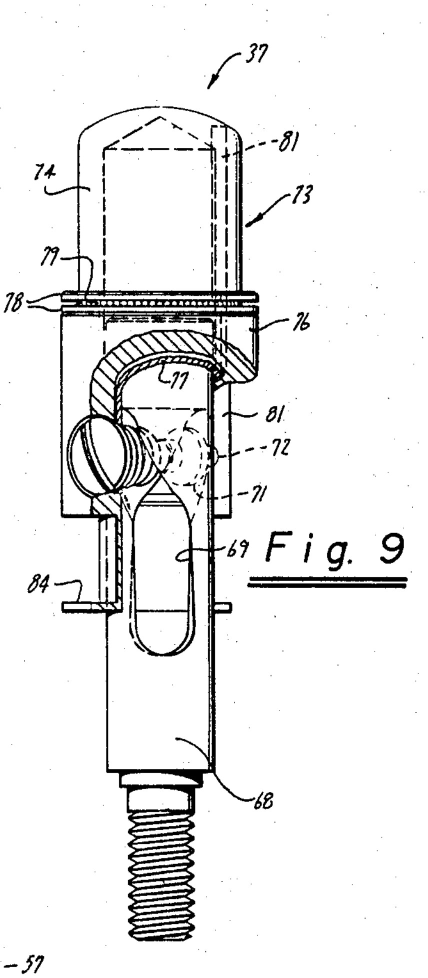
FIGURE 9 is an enlarged detail view partially broken away of another mounting post assembly.
Figure 8:
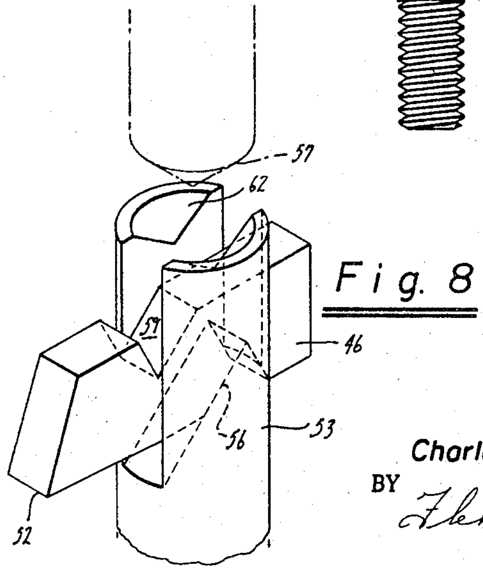
FIGURE 8 is an enlarged perspective detail view of elements of the assembly of FIGURE 7.
Figure 10:
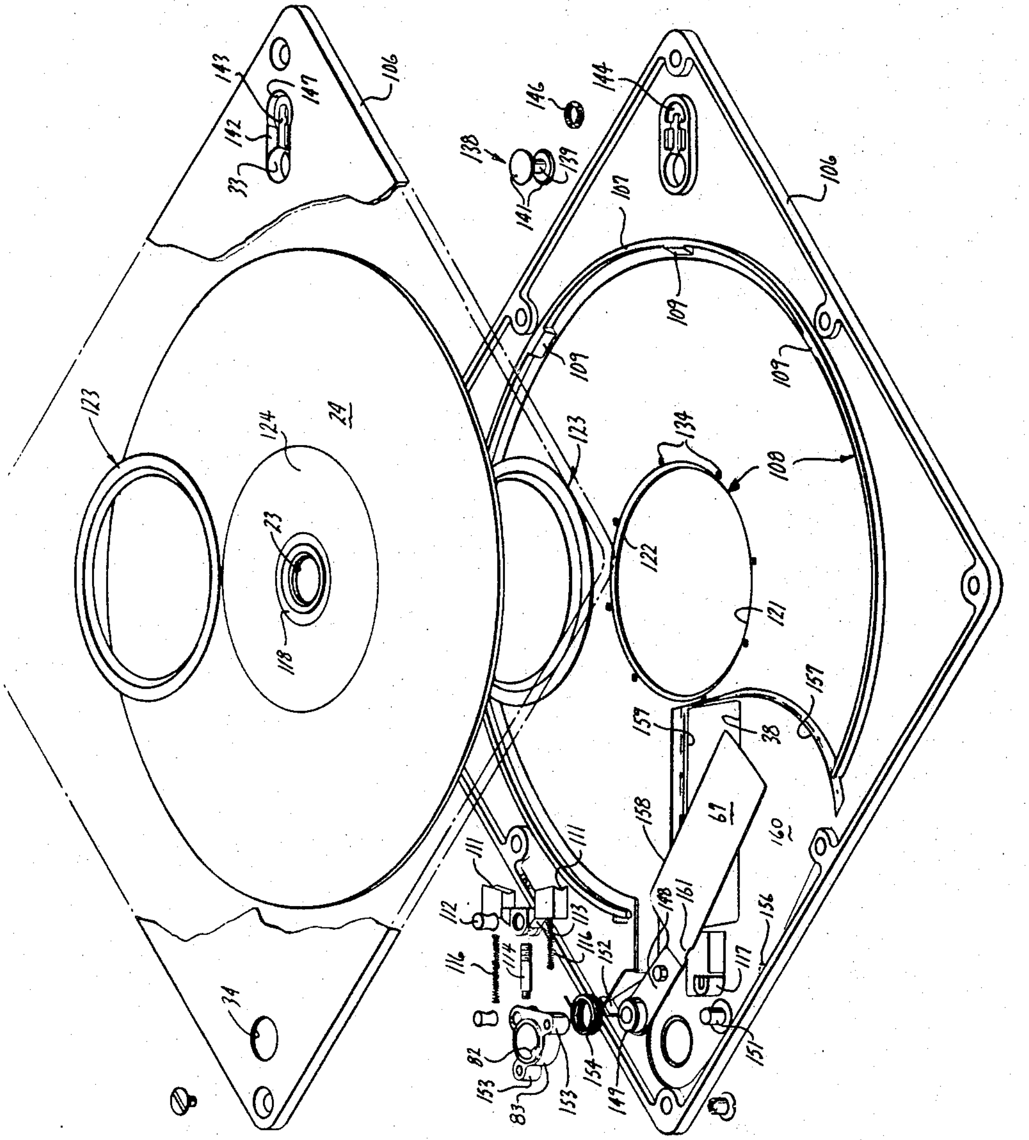
FIGURE 10 is an exploded perspective view of a disc cartridge assembly according to the invention.

Posts 36, 37 are adapted to move conjointly downwardly from projected positions to retracted positions under a downward thrusting movement applied to cartridge 12. Post 36 serves to lock both posts 36 and 37 in their retracted position by means shown particularly in FIGURE 7. Thus, the upwardly extending post 36 consists of an assembly which includes a shouldered guide sleeve 39 formed with an annular shoulder 41 whereby an alignment opening 33 of cartridge 12 permits a stud-like portion 42 to be engaged therein. At the bottom end of sleeve 39 an annular depressor follower channel 43 is dimensioned and adapted to receive a depressor follower roller 44 for purposes of synchronizing movement between posts 36, 37 and with respect to opening of doors 31, all as described further below.

In order to lock post assembly 36 in its depressed position, a latch member 46 is carried in a transversely extending opening 47 formed through the cylindrical support stud 48 so that when sleeve 39 slides axially downwardly therealong a latch shoulder 49 formed inside the bore 51 of sleeve 39 passes beneath latch member 46 whereby the tip 52 thereof can move laterally of the axis of post 36 and lock sleeve 39 in its depressed position.

Means are provided for normally urging latch member 46 laterally of the axis of stud 48. A latch plunger 53 having a tapered cam surface 54 disposed between parallel upwardly extending ears 61 cooperates with a mating cam surface 56 formed in the bottom of latch member 46 to provide lateral urging to member 46.

The pair of upwardly extending ears 61 are spaced laterally apart to permit latch member 46 to slide transversely therebetween. At the upper end of ears 61 a concave depression 62 is adapted to receive the tip 57 during downward travel thereof of a latch release button 58 carried within the hollow upper stud portion 42 of sleeve 39.

Plunger 53 is urged upwardly by a compression spring 63 carried in the cylindrical opening forming the plunger seat 64.

Thus, as cartridge 12 is thrust downwardly when supported upon stud-like portion 42, downward movement of sleeve 39 ultimately carries tip 57 of button 58 into contact with the concave depression 62. As downward movement of sleeve 39 continues, the force of spring 63 is sufficient to cause button 58 to rise relatively out of stud portion 42 against action of the spring 66 therebeneath. Ultimately, shoulder 49 passes across the tip 52 of latch member 46 and the upward urging of spring 63 serves to cam latch member 46 laterally whereby tip 52 is disposed to overlie the shoulder 49 and lock sleeve 39 in its depressed position. The underside of tip 52 is tapered slightly upwards to assist in smooth functioning thereof.

When it is desired to unlatch mounting post 36 from its depressed position, button 58 is pressed. Downward movement of tip 57, resting in concave depression 62, first drives plunger 53 downwardly sufficiently far to fully disengage cam surfaces 54, 56 and thereby release latch member 46. With latch member 46 released from engagement with plunger 53, it can be easily moved laterally by camming action developed by engagement between tip 57 as it continues downwardly into dentent notch 59 thereof.

Simultaneously with downward movement of mounting post 36, mounting post 37 is also carried downwardly and during downward movement of the latter, rotation is imparted thereto in order to operate one of two semaphor-shaped shutters 67 to uncover an associated access opening 38 on the underside of cartridge 12. Rotation of mounting post assembly 37 also functions to release a disc clamping or gripping mechanism described in further detail below so as to free disc 24 for rotation as cartridge 12 is loaded onto player 11.

Mounting post assembly 37 is constructed to include a hollow support stud 68 formed with a pair of camming slots 69 therealong on opposite sides thereof. A shouldered sleeve assembly 73 comprises a cartridge supporting cap member 74 adapted to be received by alignment opening 34 of cartridge 12, and an outer sleeve member 76 arranged concentrically of a sleeve portion 77 of cap member 74. Cap member 74 is formed with an axially extending key way 81 formed therealong adapted to cooperate with a key 82 of the cartridge cam element 83 described further below.

A pair of ball races 78 and ball bearings 79 entrapped therebetween are held axially together between the underside of cap member 74 and the top side of sleeve member 76. Sleeve member 76 and cap member 74 are held together by a cam follower roller shaft 72 which carries a pair of rollers 71 adapted to follow the contour of camming slots 69 and rotate the shouldered sleeve assembly 73. Housing 106, not element 83, bears on race 78.

During substantially the first half of the downward movement of assembly 73 it will rotate on the order of 60° whereas during the second portion of the downward movement it rotates on the order of 1°. Ball races 78 form a shoulder adapted to receive the downward thrust applied to cartridge 12 when supported upon the mounting posts 36, 37.

An annular depressor follower channel 84 receives and gives substantially vertical movement to a depressor follower roller 86 coupled to a linkage arranged to cause posts 36 and 37 to operate together in parallelism and thereby insure appropriate placement of cartridge 12 for transducing operations.

Thus, rollers 44 and 86 are carried upon the ends of a pair of lever arms 87, 88 fixed to a shaft 89 arranged to pivot at its ends about an axis 91.

Means are arranged to open doors 31 responsive to rotation of mounting post 37 so as to expose transducer assembly 32 whenever cartridge 12 is thrust downwardly into operative position on deck 17.

Thus, each of doors 31 is forced upwardly against the underside of playing deck 17 by a compression spring 89. A pair of spring guides 91 slide within springs 89 to function as restraining devices for the springs, as well as comprising means for engagement between the springs 89 and the door lifting bails 92 and the bail guides 93. The ends of spring guides 91 are received in slots formed respectively in guides 93 and bails 92. A pair of rod-formed door operating bails 94 are journaled through the upwardly extending tabs of bail guides 93 and pivotally secured to engage tabs formed on the outer edge of door lifter bails 92.

A pair of radius arms 95 extending radially outwardly from mounting post 37 are pivotally connected to operating links 96, 97 connected to the ends of bails 94.

Figure 6A:
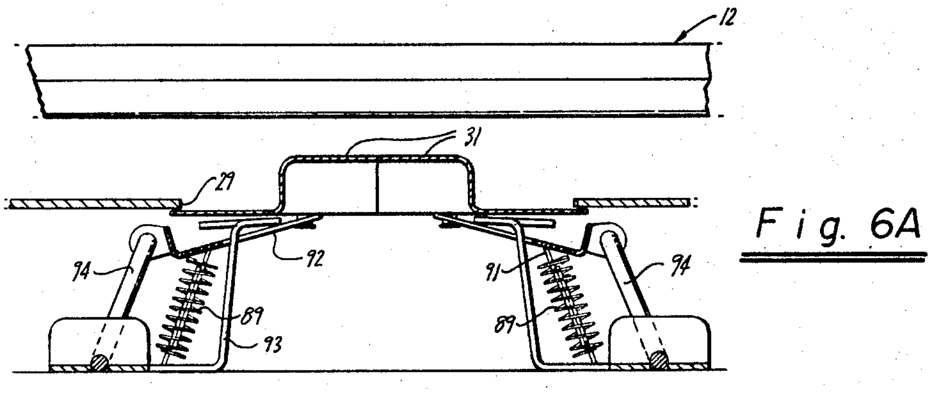
FIGURES 6A, 6B and 6C are schematic detail elevation section views demonstrating operation of the doors in their closed, open and operating positions, respectively.
Figure 6B:
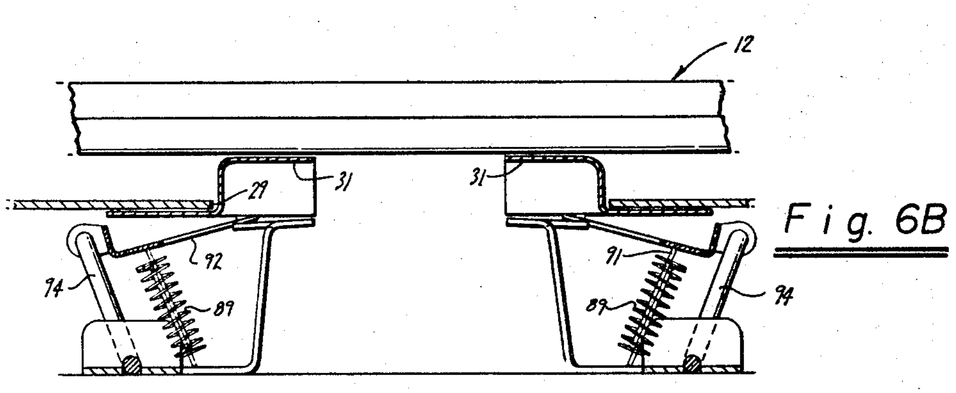
Figure 6C:
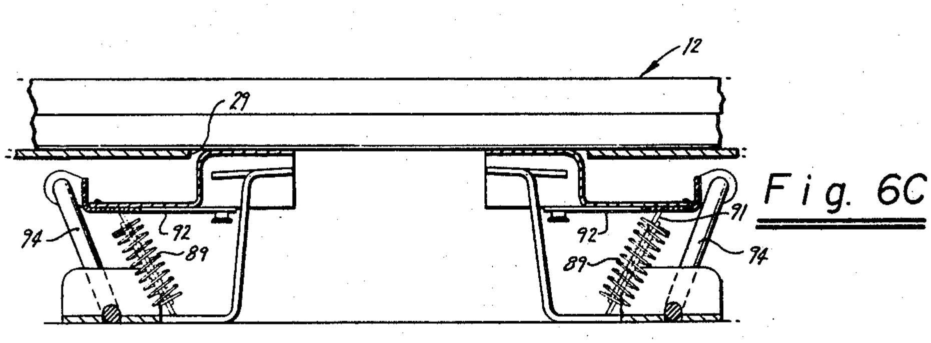

According to the foregoing description, therefore, it will be readily apparent that when a cartridge 12 is disposed upon post assemblies 36, 37 the underside of the cartridge will engage a shoulder on each and conjointly drive a sleeve portion of each assembly 36, 37 downwardly. During substantially the first half of its travel downwardly, the downward cartridge movement will be causing doors 31 to be drawn aside to a predetermined position whereby further downward movement of cartridge 12 (as shown in FIGURES 6B and 6C) can engage and force the doors 31 downwardly substantially to the level of transducer passage 29.

After cartridge 12 is disposed onto cap member 74, downward movement of cartridge 12 rotates mounting post 37 and its cap member 74 whereby camming element 83 is rotated to move shutter 67 to uncover access opening 38 while also releasing a gripping device so that disc 24 is freed for rotation upon spindle assembly 18 as will later be seen.

Doors 31, when opened, expose transducer assembly 32 for cooperation with the adjacent recording surface of disc 24. Transducer assembly 32 is arranged upon a slide assembly 98 arranged to be moved by a stepping motor 99. Motor 99 drives a pinion 101 disposed in cooperation with a rack mounted along the side of slide assembly 98. Thus, transducer assembly 32 is arranged to move radially from one track to the next on record disc 24. The transducer element 102 is arranged to ride in contacting relation upon the under surface of disc 24 for transducing electrical signals with respect to the disc (i.e., for reading or writing information thereon). Thus, transducer element 102 is preferably of the type adapted to record upon and to read from the information surface portion of disc 24.

Means are provided for locking out the recording circuitry of transducer element 102 as desired. A control switch assembly 103 forms a part of the recording circuit for element 102 and includes a switch actuator feeler 104. Feeler 104 extends upwardly above playing deck 17 at a disposition adjacent to mounting post assembly 36.

The information storage cartridge 12 for use with the player apparatus 11 described above, comprises generally container means such as a housing forming an envelope enclosing a rotatable magnetic record disc. The container means is formed from a pair of identical opposed housing halves 106. Alignment openings 33, 34 are formed in each housing half 106 at diagonally opposite corners so as to be adapted to receive the mounting posts 36, 37. Screws draw the two housing halves together to bring their component parts into registration with each other.

In a peripheral portion of cartridge 12, preferably adjacent alignment opening 33, a readily removable control element (in the form of a collar button-shaped insert 138) is disposed and adapted whereby when cartridge 12 is positioned in operative transducing relation upon playing deck 17, element 138 is adapted to cooperate with feeler 104 to permit the recording circuitry of transducer element 102 to function.

Control element 138 can be removed through opening 33 whereby, in its absence, feeler 104 of switch assembly 103 will not be depressed. Accordingly, the recording circuitry of transducer element 102 is thereby disabled. Thus, it will be readily apparent that a supervisor of an installation utilizing apparatus of the kind described above can remove each control element 138 of any number of cartridges so that he can be assured that no recording upon the discs will take place without his permission and without his supervision, by inadvertence or otherwise.

While the foregoing discussion presumes that it is preferred to wire transducer element 102 in circuit with switch means 103 in a manner whereby absence of control element 138 disables the recording mode of operation, it will be readily apparent that by reversely connecting switch assembly 103, the opposite function can be obtained.

Control element 138 includes a shank 139 extending between a pair of resilent disc-shaped ends 141. The opposed surfaces of discs 141 are adapted to engage wedging surfaces 142 defined on opposite sides of a slot 143 formed through each housing half 106 at a position adjacent opening 33. One end of solt 143 passes radially into opening 33 and the other end of slot 143 terminates in an enlarged recess 144 between halves 106. Recess 144 is dimensioned to capture an annular coil spring 146 between each inner half of housing 106. On the outside of halves 106 slot 143 passes into enlarged pockets 147 which permit the upper and lower resilient disc 141 of element 138 to be loosely seated in pocket 147.

Thus, spring 146 bears against shank 139 and urges element 138 in the direction of opening 33. However, movement in this direction is arrested by frictional engagement between wedging surfaces 142 and the opposed faces of disc 141. At this disposition of element 138 it is positioned to register with feeler 104 and operates switch 103 whenever cartridge 12 is pressed into operative playing position on deck 17.

From the foregoing it will be readily apparent that if control element 138 is disposed in its slot 143 and thereafter cartridge 12 is mounted in playing position upon deck 17, it will be impossible, without first removing cartridge 12 from the playing deck, to remove element 138. In short, element 138 can only be removed by forcing it past wedging surfaces 142 into opening 33 where it drops out of cartridge 12.

Control element 138, after having been inserted into opening 33 and slidably forced past wedging surfaces 142, is yieldingly urged by spring 146 in the direction of opening 33 into arrested engagement with wedging surfaces 142. In this position, when cartridge 12 is placed in operative position with player 17, feeler 104 engages the underside of control element 138 and is depressed. Feeler 104 is spring urged upwardly by a spring (not shown). Thereafter, when control element 138 is slidably moved (against the action of spring 146), feeler 104 will move upwardly to serve as a lock-out against return movement of element 138.

Thus, by making suitable wiring connections between switch assembly 103 and transducer element 102, another mode of operation employing control element 138 can be pursued whereby element 138 remains with cartridge 12 in a manner so that when cartridge 12 is placed in operative position upon the playing deck, element 138 serves to actuate switch assembly 103 to lock out the "write" circuitry. Element 138 must be moved against the action of spring 146 in order to permit the recording mode to be followed.

Circular ribs 107 are formed in each housing half 106 whereby a large generally circular envelope 108 for disc 24 is defined when ribs 107 are brought together in registration with each other. Each housing half 106 includes an access opening 38 leading into envelope 109 for accommodating transducer cooperation with a disc 24 therein.

Gripping means have been provided which are normally active when cartridge 12 is not in use to support disc 24 intermediate the inner surfaces of housing 106 and preferably midway between such inner surfaces. The gripping means maintains a predetermined spacing between the disc surfaces and the inner envelope surfaces. The gripping means is movable to release disc 24 for rotation within the envelope responsive to placement of the cartridge into operative disposition with the player.

More particularly, three fixed seats 109, aer formed integrally with ribs 107 and include a tapered surface whereby when the two housing assemblies 106 are brought together they will define a detent therebetween bounded by camming surfaces adapted to engage the edge of disc 24 and cam it into position midway between the inner surfaces of envelope 108.

A pair of movable seats 111, shaped similarly to seats 109, are arranged to be moved between advanced and retracted positions to respectively engage and disengage the edge of disc 24 at points opposite fixed seats 109. Thus, seats 111 are carried on the ends of a yoke 113 supported upon a pivot pin 112. A drive link 114 seves to connect yoke 113 to a pivotal connection with one lobe of camming element 83.

Each of the movable seats 111 is spring urged by means of a coil spring 116 (for a purpose described further below). Springs 116 are each disposed in a blind hole at the rear of each seat 111 and at their other ends disposed in a cup 117 formed in housing halves 106. As movable seats 111 are moved forwardly toward the edge of disc 24, they grip it and urge its edge into detents formed by seats 109.

From the foregoing, it will be evident that rotation of camming element 83 serves to draw drive link 114 between advanced and retracted positions toward and away from disc 24. This rotation is derived from rotational movement of mounting post assembly 37 as it is urged downwardly when installing cartridge 12 onto the player.

When the cartridge is not in use, the disc is eccentrically displaced to rest against seats 109. Disc 24 is held in this position by the movable seats 111 whereby disc 24 is held safely immobile until it is placed upon player 11.

As noted above, the act of lowering cartridge 12 into its operating position on player 11 causes camming element 83 to be rotated approximately 60° counterclockwise, to release disc 24 for rotation within its envelope. It is, however, when released, out of concentricity with drive spindle assembly 18.

Accordingly, means for centering disc 24 coaxially of drive spindle assembly 18, includes a hardened insert 118 in the hub portion 124. Insert 118 is formed with the chamfered frusto-conical centering surface 23. As the disc descends onto alignment spindle 21, frusto-conical centering surface 22 thereof serves to cooperate with surface 23 and "cam" the disc into concentricity.

When cartridge 12 is removed from player 11, camming element 83 and movable seats 111 return to their normal positions to urge disc 24 against seats 109. Thus, that edge of disc 24 which contacts seats 109 is guided into the notch or detent formed between the bounding camming surfaces thereof so as to axially center disc 24 within its envelope.

Envelope 108 of cartridge 12 is maintained virtually completely free of contaminants which might otherwise have deleterious effect upon the recording surfaces of the disc. The disc operates in a stream of filtered air carried through the envelope. Player 11 includes an air filtering system which accepts air from the surroundings via inlet ports 119 formed at the side of deck 17 and via blower 135. After filtering the air in a unit within housing 136, it flows upwardly past transducer assembly 32 via passage 29. Access opening 38 on the underside of cartridge 12 is adapted to register with, and confine, the stream of filtered air as it rushes past transducer assembly 32 as well as to accommodate transducer cooperation with disc 24. Shutter means described further below have been provided whereby when cartridge 12 is in playing position upon deck 17, only the lower shutter 67 will be in its uncovered position whereby opening 38 at the top will remain covered. Envelope 108 is, however, provided with exhaust passages as now to be described whereby air from the entering filtered air stream exhausts primarily from the top side of cartridge 12 via radial clearance around knob assembly 13.

Each housing assembly 106 includes a central opening 121 adapted to receive the rotating drum 27 of spindle assembly 18 in driving relation with hub portion 124 of disc 24. Disc 24 further includes an information portion radially outwardly of the hub portion and formed of a material adapted to receive magnetically recorded electrically signal information thereon.

Each central opening 121 includes a recessed annular lip or shoulder 122 therearound whereby an annular dust seal element 123 can nest loosely therein.

Dust seal element 123 is of a flexible, resilient plastic, such as an acetal resin, and is disposed between an associated side of the disc 24 and the adjacent inner surface of envelope 108. Seal element 123 normally forms a closure between the disc and inner surface of the envelope. Each of seals 123 is flexibly movable toward disc 24 to provide exhaust clearance between itself and the envelope surface whereby air can escape around hold-down knob 13.

Seal element 123 is arranged to flex between expanded (closure forming) and collapsed positions and is characterized by a tendency to remain in its collapsed position when it has been moved thereto by the compression as is applied through engagement of hold-down knob assembly 13. The edge 45 of drum 27 engages the bottom seal element 123, and the lower edge of shell 167 of knob assembly 13 engages the upper seal 123.

Thus, seal element 123 comprises inner and outer annular portions 126, 127 each of which is formed as a surface of revolution defined by rotating a straight line disposed at an angle to a plane 128, which is normal to the axis of revolution of the line. The angle which the straight line makes with plane 128 is greater for inner annular portion 126 than for outer annular portion 127. The outer circumferential edge of inner portion 126 and the inner circumferential edge of outer portion 127 merge and form a mid-circumference 129 where they meet at a relatively large oblique angle 131 defined between surfaces of portions 126, 127.

Flexibility and resilience of the material of annular portions 126, 127 is such that compression applied adjacent to the mid-circumference 129 serves to flex both annular portions about the inner circumference 132 of inner portion 126. Accordingly, inner portion 126 protrudes radially into opening 121 to be engaged by knob assembly 13 or edge 45 whereby upon application of compression the outer annular portion 127 can be collapsed axially away from the inner adjacent surface of envelope 108 to provide an exhaust clearance between it and such inner envelope surface.

Seal element 123 exhibits a tendency to remain in its collapsed position whereby it can be retained collapsed with a very light compression loading applied thereto. This may be explained by the fact that annular portions 126, 127 include a mid-circumference formed by a relatively large angle therebetween to impart a sufficient rigidity whereby when the seal is compressed between coplanar surfaces, the inner circumference 132 of seal element 123 goes somewhat into compression longitudinally there-around. On the other hand the resilience of the material is such that the outer circumference 133 of seal element 123 becomes slightly stretched whereby as circumference 133 approaches plane 128 seal element 123 approaches a point where it would have a tendency to try to turn itself inside out. Restorative stresses in the elastomeric material are, however, sufficient to cause the seal to return to its normal state after removal of externally applied forces.

In its collapsed position, the toggling tendency of seal 123 moves edge 133 into contact with the surface of disc 24 to provide maximum air passage. Edge 133 remains held in this position by minimal axial loading forces applied by hold-down knob 13. The minimal loading required to hold seal element 123 collapsed is advantageous since excessive upward force applied to disc 24 by axial upward urging of the lower seal would tend to unseat disc 24 from its position of intimate contact with drive spindle 18.

Seal elements 123 are loosely retained unattached upon shoulder 122. There is also provided adjacent shoulder 122, a number of circumferentially spaced studs adapted to form stops by contact with hub portion 124 so as to ensure that the inner surfaces which form envelope 108 cannot be pressed against the recording area of disc 24, as, for example, if a large weight were inadvertently rested upon cartridge 12. Studs 134 further ensure that after seal element 123 has been collapsed by compression, an air passage will be formed for exhausting air entering through the lower access opening 38.

Figures 2, 4:
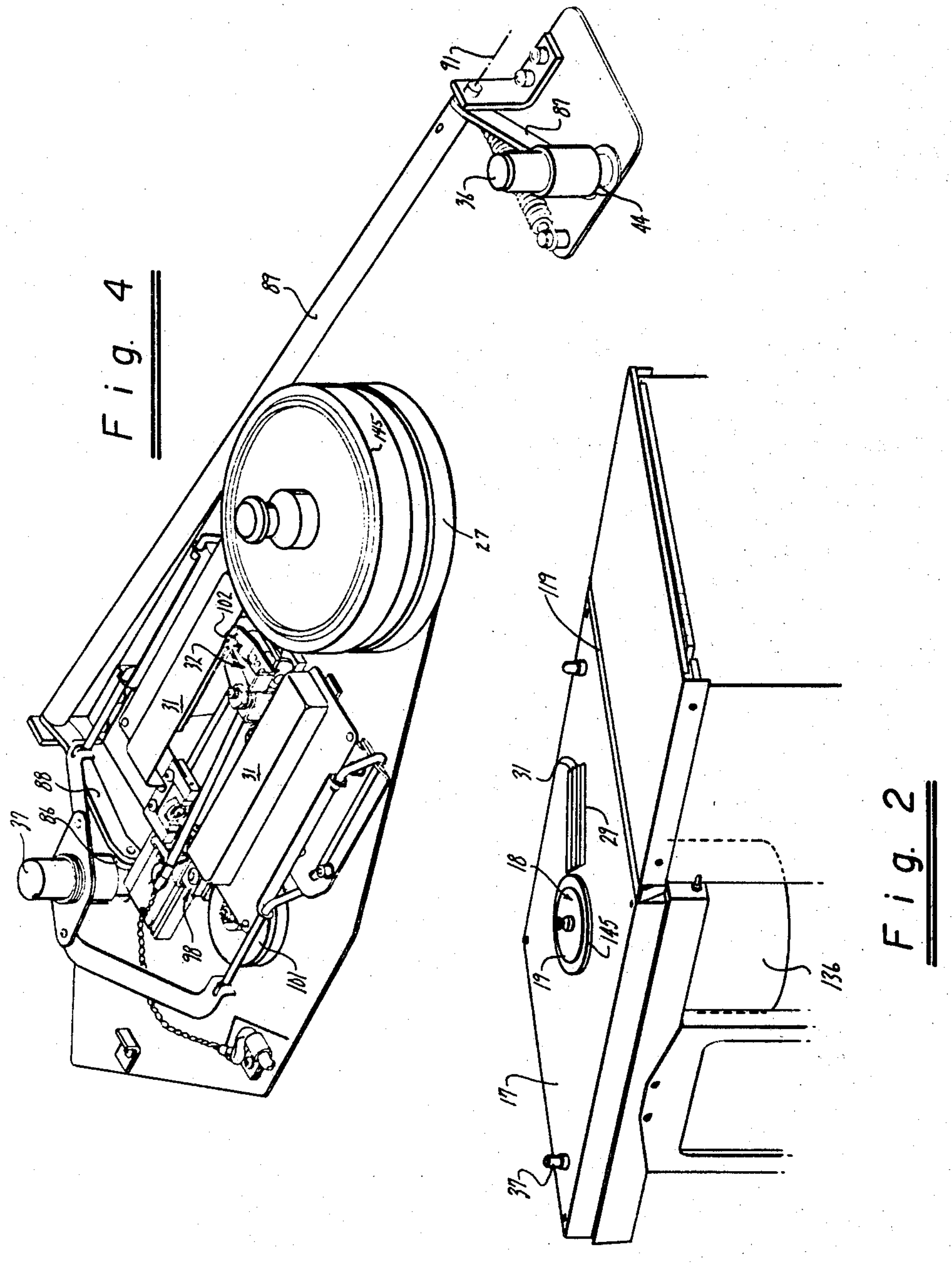
FIGURE 2 is a perspective view of the playing deck of the player apparatus with surrounding apparatus removed for clarity.
FIGURE 4 is an enlarged detailed view in perspective showing the access doors of the player apparatus in their open condition.
Figure 3:
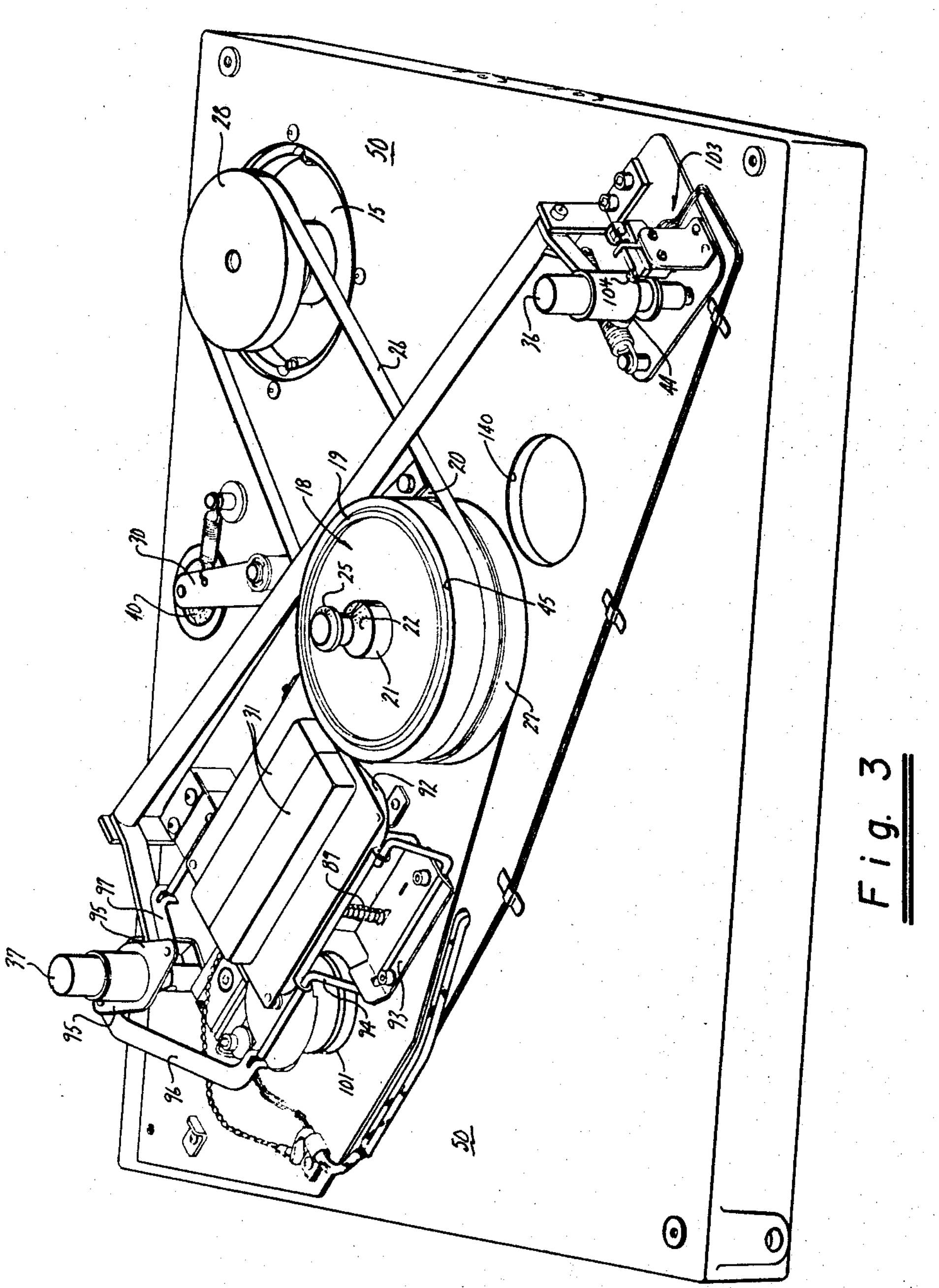
FIGURE 3 is an enlarged detailed perspective view showing the player with the playing deck cover removed.
Figure 5:
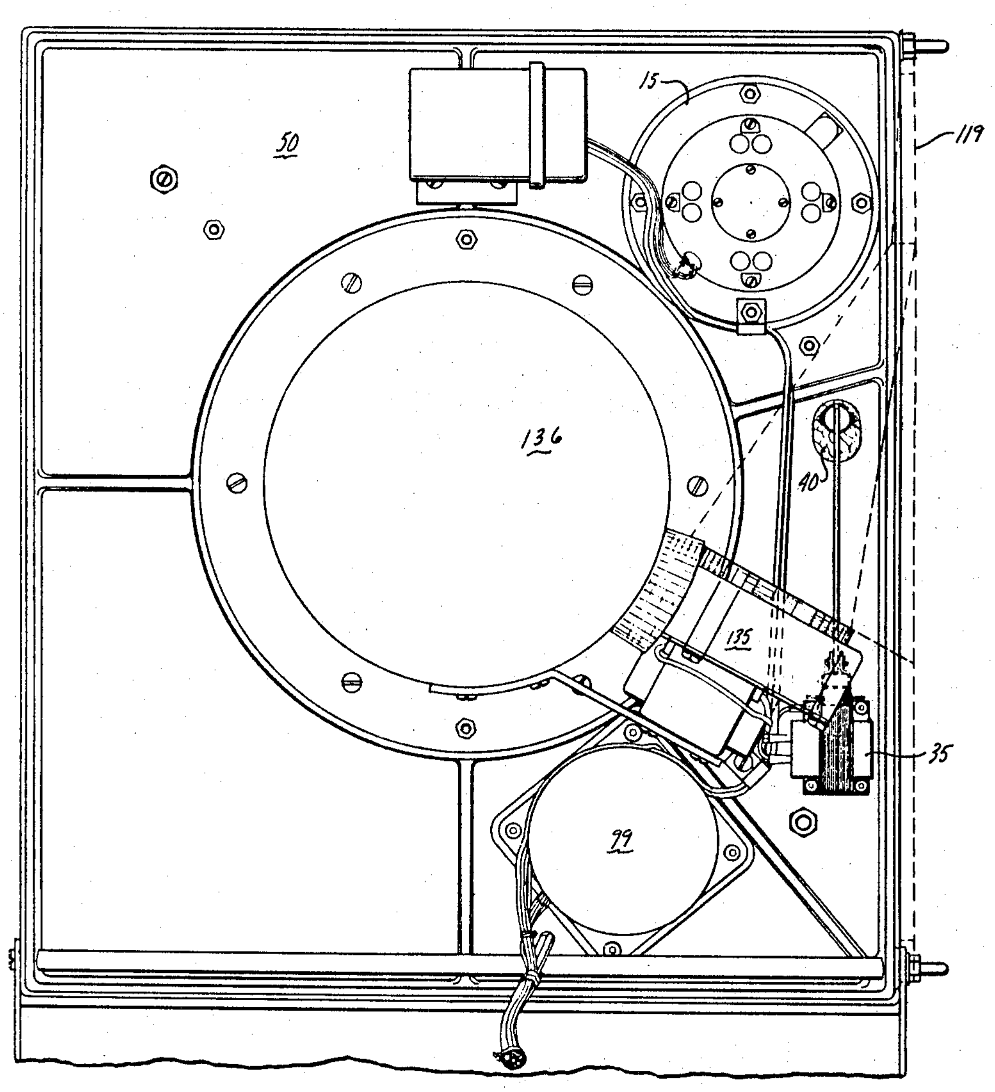
FIGURE 5 is a plan view from underneath of the player apparatus, taken along the line 5—5 of FIGURE 1.

Thus, the stream of filtered air will be defined commencing with inlet port 119 where it is drawn into player 11. Blower 135 draws the air inwardly through port 119 and directs it through an air filtering unit located within enclosure or housing 136, (FIGURE 2). After filtering, the air is forced upwardly through exhaust port 140 in base 50 and then via transducer passage 29 as well as through clearance 145 provided between drum 27 and deck 17. Air exhausting via passage 29 moves through access opening 38 adjacent thereto. The air then exhausts upwardly around disc 24 as it escapes from envelope 108 via exhaust passages formed by the collapsed seal element 123 on the upper side of disc 24, clearance being provided between knob 13 and opening 121. Passages formed on the underside of disc 24 around seal element 123 also pass air as it moves upwardly.

Hold-down knob 13 forms an assembly whereby hub portion 124 of disc 24 can be solidly clamped between annular rib 19 of spindle assembly 18 and an annular rib 137 formed on the underside of the knob assembly 13. Detailed description of hold-down knob assembly 13 is provided further below. Shutter means have been provided in cartridge 12 whereby a semaphor-shaped shutter 67 can be rotated between covered and uncovered positions with respect to an associated access opening 38. Shutter 67 includes a stem or arm portion 148 provided with a journal sleeve 149 adapted to be pivotally mounted upon a pivot boss 151 formed in an associated one of housing halves 106.

Inasmuch as the construction of one shutter assembly is illustrative of the other shutter assembly, it is to be understood that like parts are provided in both upper and lower housing halves 106 and only one such assembly will be described.

Arm portion 148 includes a vertically extending outwardly diverging ear 152 adapted to cooperate with one of two lobes 153 formed on camming element 83. A torsion spring 154 in each assembly engages ear 152 at one end and is captured in a detent 156 at the other end formed as an integral portion of the molded housing half 106. Spring 154 is arranged whereby it yieldingly urges shutter 67 to a closed position overlying opening 38.

During cartridge loading, as shown in FIGURE 12, counter-clockwise movement of cam element 83 causes only the lower shutter 67 to move clockwise thereby uncovering its associated access opening 38 to provide access for transducer assembly 32 of player 11. Thus, transducer element 102 can cooperate with disc 24 for recording or reading operations. The upper shutter 67, however remains closed and thereby serves to protect against entry of contaminants into envelope 108. During operation the air exhausting via the upper opening 121 makes it additionally difficult for contaminants to enter envelope 108, and it, therefore, remains virtually free of deleterious elements.

The outer end of each shutter 67 travels in an arcuate groove 157 formed by molding a depression 160 in each housing half 106 and then inserting a die-cut plastic strip cemented into place onto a shelf formed at the edge of the depression. The strip is adapted to overlie the blade-like end of shutter 67. In its closed position, the full length of one side 158 of shutter 67 is lodged in a slot 159 similarly formed along the edge of opening 38. On the opposite side from side 158 a raised region 161 is formed in position so that it comes to rest beneath a post 162 formed to project from the other half of housing 106. Accordingly, shutter 67, when closed, is confined against axial movement toward the surface of disc 24 along edge 158 and is also constrained against axial movement toward the disc surface at the other edge by means of region 161 coming into abutment with post 162.

Cam element 83 is normally held centralized by the opposing forces of the two springs 154. It will be observed that at the extreme positions in its angular travel, however, the camming forces which will exist between lobes 153 and ears 152 will be quite small due to the angle of contact therebetween. Accordingly, the two compression springs 116 are employed to pull camming element 153 out of this semi-locked condition. This unlocking bias force 153 derives from the resilient compression applied between cups 117 and the blind holes drilled in the back side of movable seats 111.

From the foregoing, it will be readily evident that cartridge 12 can be rotated about an axis in the plane of disc 24 to an inverted position so that it is adapted to dispose either of access openings 38 in registration with transducer passage 29 for transducing operations with disc 24. The shutter means for each of the access openings are each movable between normally closed and open positions respectively covering and uncovering the access opening which is associated therewith. Means as described above therefore have been provided for moving, only such of those shutter means as is required for transducing operations when the cartridge is operatively engaged with the playing deck, and, but for the filtered air stream passing through the cartridge it remains substantially sealed against the outside surroundings.

Hold-down knob assembly 13 serves to engage the umbrella-like flange 25 of assembly 18 and thereby draw itself downwardly whereby annular rib 137 is urged against the upper surface of hub portion 124 to force the lower surface of hub portion 124 into engagement with rib 19 on spindle assembly 18.

Hold down knob assembly 13 operates between bistable states of expanded and compressed conditions. The assembly comprises a pair of telescopically disposed shells 166, 167. Each shell contains a generally U-shaped frame 168, 169. These are slidably engaged with each other, frame 169 being disposed for movement inside frame 168. A centrally located shaft 171 is held in place to extend between frames 168, 169 by four snap rings engaging grooves 172 at each end of shaft 171. Two of the snap rings are disposed inside frame 169 and two are disposed outside frame 168. Frames 168, 169 are urged apart by torsion spring 173 supported about shaft 171 and formed with a pair of arms which engage a pair of spacers 174 which are carried on two additional shafts 176. These two additional shafts 176 are supported in holes 177 of frame 168 and are held in place by retaining rings in their outer grooves.

In addition to the foregoing two spacers, each of shafts 176 supports a pair of links 178. Links 178 are at opposite ends of the spacers, and are held in place against them by retaining rings. The free ends of the four links 178 are engaged with the small ends of another set of four identical links 179.

The means for engaging alignment spindle 21 comprises the pins 181 and a second set of spacers 182. Pins 181 are interconnected by a pair of tension springs 183 which engage the grooves at their ends. Pins 181 are, therefore, by this means restrained against axial movement and urged toward each other until stopped against the abutment surface portions 184 of outer frame 168.

The ends of each link 178, 179 are formed whereby each link includes an end of large diameter and an end of a smaller diameter. The small ends of links 178, 179 are connected together and the large radius ends are engaged with small holes in a toggle dog 186 by means of pins 187. The two toggle dogs 186 pivot at the midpoints of shafts 188 which are supported in holes 189 of frame 169. Shafts 188 have grooves in them which engage the large radii of the connecting links 179, such that the shafts are axially constrained and the links are kept in place against the insides of the frame. A pair of spacers 191 serve to hold each dog 186 in the middle of its supporting shaft.

The inner shell assembly 192 is held in place on frame 169 by means of two flat head screws. It is this inner shell which clamps against disc 24. Accordingly, inner shell 192 is formed to include the annular rib 137 on its bottom surface.

When the hold-down knob 13 is being clamped onto a disc 24, relative movement of the assembled components causes dogs 186 to be rocked inwardly, or toward each other, which carries their points 190 into contact with the underside of the spindle's umbrella-like flange 25 when the telescoping assembly is still on the order of half an inch short of its full stroke position. As the downward stroke continues, the now arrested dogs act as stationary pivots for the lower set of links 179 such that they are forced to swing outward through arcs which lift the spring loaded pins 181 off of their seats or abutment portions 184 of frame 168.

In the last portion of the stroke, springs 183 are carried past the centers of shafts 187. The holding force of this over-center toggled mode of operation is sufficient to overcome the upward releasing force applied by torsion spring 173. The knob, 13, therefore, remains in a collapsed state until its outer shell is lifted to release it.

In its toggled clamping state, the combined pull of springs 183 is transmitted to the underside of the umbrella or flange 25 of the spindle assembly 18 by the links and the right angled leverage of dogs 186. An equal reactive force is transmitted to disc 24 by the inner shell 167.

From the foregoing description it will be readily apparent that there has been provided a magnetic recording cartridge including a housing defining an envelope to enclose a rotatable magnetic recording disc. The cartridge is invertible so that either side of the disc may be played.

The disc is maintained within an envelope wherein the environmental conditions are maintained relatively contaminant-free due to the application of a forced draft of filtered air continuously passing through the open transducer passage and exhausting outwardly of the central openings when the dust seals are in their collapsed state. Whenever the cartridge is removed from the player, the dust seals flex to projected positions forming a closure between the disc and the inner surfaces of the envelope.

Means have been further provided in the description above for gripping the disc when the cartridge is not in use so as to maintain the disc spaced midway between the inner surfaces of the cartridge and thereby protected to a maximum extent. It was also noted that a control element is carried by the cartridge and adapted whereby a write lock-out of the recording circuitry for a transducer element can, as desired, be readily removed or inserted into the cartridge to cooperate with the player.

While the cartridge has been described to infer that its utility is mainly with digitally recorded data storage systems, it should be readily apparent that such a cartridge could readily be adapted for use in handling magnetically recorded entertainment information such as music or conversations as well.

I claim:

1. An information storage cartridge comprising container means forming an envelope, a rotatable information storage disc within the envelope, said container means including an access opening defined in a plane lying in substantially co-planar relation to said disc and adapted to accommodate therethrough transducer cooperation with a recording surface portion of the disc, shutter means movable in a substantially co-planar relation to said disc between a normally closed and an open position respectively covering and uncovering the opening so as to be adapted to be moved to expose a recording surface portion of said disc to permit movement of a transducer into and out of cooperative relation with said disc therethrough, and means for moving said shutter means from said normally closed to said open position and adapted to operate responsive to placement of the container means into operative disposition with utilization means for said disc.

2. An information storage cartridge comprising container means forming an envelope enclosure, a rotatable information storage disc within the enclosure, said container means being formed and adapted to dispose either side of the disc into cooperative relation with utilization means having transducer means for cooperating with a given one of the sides of the disc, said container means including access openings on opposite sides of the disc each adapted for transducing operations therethrough, shutter means for each of said openings movable between a normally closed and an open position respectively covering and uncovering the openings so as to be adapted to be moved to expose a recording surface portion of said disc for transducing operations therewith, and means for moving that one of said shutter means associated with said given side of said disc from said normally closed position to said open position, the last named means being adapted to operate responsive to placement of the container means into operative disposition with the utilization means.

3. An information storage cartridge comprising container means forming an envelope, a rotatable information storage disc within the envelope, said container means including alignment portions adapted to cooperate with alignment means of utilization means for said disc, said container means including access openings on opposite sides of the disc, each said access opening being adapted for transducing operations therethrough in cooperation with a recording surface portion of said disc, both said alignment portions and both said access openings being disposed on opposite sides of said container means to permit said cartridge to be rotated about an axis in the plane of the disc to an inverted position thereby being adapted to dispose either of said access openings in registration with utilization means for transducing operations, shutter means for each of said access openings, each shutter means being movable between normally closed and open positions respectively covering and uncovering the access opening associated therewith, and means for moving only such of said shutter means as is required for transducing operations when said cartridge is operatively engaged with the utilization means.

4. In an information storage cartridge, a construction comprising container means forming an envelope, a rotatable information storage disc within the envelope, said disc having an information record portion and a hub portion, the hub portion being formed and adapted to be engaged by a rotary drive member of utilization means for the cartridge, central openings in said container means on opposite sides of the disc and registering with said hub portion so that each central opening is adapted to pass a rotary drive member into driving relation with said hub portion, a flexible dust seal element around each of said central openings and disposed between an associated side of the disc and the adjacent inner surface of the envelope for normally forming a closure therebetween, each of said seals being depressible toward said disc to provide clearance between said envelope and said seal during rotation of the disc, a portion of each seal protruding into its associated one of said central openings and adapted to be depressed by compression between the rotary drive member and means for attaching the hub portion to the rotary drive member.

5. Apparatus according to claim 4 wherein said seals are formed to comprise inner and outer annular portions, each formed as a surface of revolution defined by rotating a line disposed at an angle to a plane normal to the axis of revolution, said angle for said line of one annular portion being greater than that for the other annular portion, the outer circumferential edge of said inner annular portion and the inner circumferential edge of said outer annular portion merging and meeting at a relatively large oblique angle defined between the surfaces of said annular portions to define a mid-circumference between the inner circumference of said inner annular portion and the outer circumference of said outer annular portion, the flexibility and resilience of said annular portions being such that said compression applied adjacent said mid-circumference serves to flex said annular portions about the inner circumference of the inner portion and to move said outer annular portion axially away from said inner surface of the envelope and provide said clearance.

6. Apparatus according to claim 4 wherein said seals are arranged to move axially between normally projected and collapsed positions and are characterized by a predetermined restorative force acting axially thereof when is said collapsed position, said predetermined force being substantially less than that required to be overcome in moving said seals from their projected positions to their collapsed positions.

7. An information storage cartridge comprising container means forming an envelope, a rotatable information storage disc within the envelope, gripping means normally active when said cartridge is not in use to support said disc intermediate the inner surface of said envelope at predetermined spacing thereto, said gripping means being movable to release said disc for rotation within the envelope, said container means including an access opening adapted for transducing operations therethrough in cooperation with a recording surface portion of the disc, shutter means movable between a normally closed and an open position respectively covering and uncovering the opening so as to be adapted to be moved to expose a recording surface portion of said disc to permit transducing operations therethrough, and means for moving said shutter means from said normally closed to said open position and to move said gripping means to release the disc for rotation, the last named means being adapted to operate responsive to placement of the container means into operative disposition with utilization means for said disc.

8. Apparatus according to claim 7 wherein the last named means includes a rotatable sleeve adapted to engage and rotate with rotation of an upstanding post of said utilization means, camming elements carried by said sleeve and disposed to cooperate with said shutter means, and force transmission means coupled to said sleeve to draw said gripping means to release said disc upon rotation of said sleeve.

9. An information storage cartridge comprising container means forming an envelope, a rotatable information storage disc within the envelope, said disc including an information storage portion and a hub portion, means movable between advanced and retracted positions for respectively engaging and disengaging the disc and for axially positioning the disc surfaces at predetermined spacing from the inner surfaces of said envelope when engaged, means adapted to cooperate with utilization means for the disc and move the last named means to said retracted position to free the disc for rotation, said hub portion including means adapted to cooperate with a drive spindle of the utilization means for positioning said disc into concentricity with the axis of the spindle, said container means including an access opening adapted to permit transducing operations therethrough in cooperation with a recording surface portion of the disc, shutter means movable between a normally closed and an open position respectively covering and uncovering the opening so as to be adapted to be moved to expose a recording surface portion of said disc for the transducing operations and means for moving said shutter means from said normally closed to said open position, the last named means being adapted to operate responsive to placement of the container means into operative disposition with the utilization means for said disc.

10. An information storage cartridge comprising container means forming an envelope, a rotatable information storage disc within the envelope, first seat means within said envelope adjacent the edge of the disc and forming a detent bounded by guiding surfaces disposed to engage the edge of the disc and direct said edge toward said detent, second seat means adjacent the edge of the disc and forming a detent bounded by guiding surfaces disposed to engage the edge of the disc and direct said edge toward the last named detent, means for moving one of said first and second seat means relatively with respect to the other between relatively advanced and retracted positions to respectively engage and disengage the disc therebetween, the last named means being adapted to move said one of said seat means to the retracted position in response to placement of the cartridge into playing position with utilization means for the disc, said container means including an access opening adapted for transducing operations therethrough in cooperation with a recording surface portion of the disc, shutter means movable between a normally closed and an open position respectively covering and uncovering the opening so as to be adapted to be moved to expose a recording surface portion of said disc for transducing operations therewith, and means for moving said shutter means for said normally closed to said open position, the last named being adapted to operate responsive to placement of the container means into operative disposition with utilization means for said disc.

11. An information storage cartridge comprising container means forming an envelope, a rotatable information storage disc within the envelope, said disc including an information storage portion and a hub portion, said hub portion including registration means adapted to cooperate with a projecting portion of a rotary drive member for translating said disc into concentricity with the axis of rotation of the rotary drive member, central openings in said container means on opposite sides of the disc and registering with said hub portion so that each central opening is adapted to pass the rotary drive member into driving relation with said hub portion, fixed seats within said envelope adjacent the edge of the disc and movable seats adjacent the edge of the disc across from said fixed seats, said movable seats being movable to an advanced position urging said disc against said fixed seats for axially positioning the disc surfaces at predetermined spacing from the inner surfaces of said envelope when engaged, means adapted to cooperate with utilization means for the disc for moving said movable seats to their retracted position to free the disc for rotation conjointly with translation of the disc, the last named means being responsive to placement of the cartridge into operative engagement with utilization means for the disc, a flexible dust seal element around each of said central openings and disposed between an associated side of the disc and the adjacent inner surface of the envelope for normally forming a closure therebetween, each of said seals being depressible towards said disc to provide clearance on both sides of the disc between said envelope and said seals during rotation of the disc within the envelope, each seal being adapted to be depressed by opposed movement between the rotary drive member on one side of the disc and means on the other side of the disc for attaching the hub portion to the rotary drive member.

12. An information storage cartridge for use with utilization means having transducer means associated therewith, said cartridge comprising container means forming an envelope enclosure, a rotatable information storage disc within the enclosure, said container means including an access opening adapted for transducing operations therethrough in cooperation with a recording surface portion of the disc, a readily removable control element carried by said container means, said control element being disposed and adapted for directly operating transducer switch means of said utilization means, by the presence or absence of said element when carried at a predetermined position on the enclosure, when said cartridge is positioned in an otherwise operative transducing relation with the utilization means, shutter means movable between a normally closed and an open position respectively covering and uncovering the opening so as to be adapted to be moved to expose a recording surface portion of said disc for transducing operations therethrough, and means for moving said shutter means from said normally closed to said open position and adapted to operate responsive to placement of the container means into operative disposition with the utilization means for said disc.

13. An information storage cartridge according to claim 12 wherein said container means supports said control element for movement between first and second positions when said cartridge is disposed in operative position with respect to said utilization means, said first position being disposed and adapted to register with said control element to engage and operate the switch means and in the second position to be clear of said switch means, and means resiliently urging said control element toward said first position.

14. An information storage cartridge for use with utilization means having transducer means associated therewith, said cartridge comprising container means forming an envelope enclosure, a rotatable information storage disc within the enclosure, said container means including an access opening adapted for transducing operations therethrough in cooperation with a recording surface portion of the disc, alignment openings extending into a peripheral portion of said container means and adapted to receive projecting studs of utilization means for said disc to align said access opening with transducer means of the utilization means, a readily removable control element carried by said container means adjacent to and removable through one of said alignment openings, said control element being adapted, when said cartridge is positioned in operative transducing relation with the utilization means, to cooperate with switch means controlling the transducer, shutter means movable between a normally closed and an open position respectively covering and uncovering the opening so as to be adapted to be moved to expose a recording surface portion of said disc for transducing operations therethrough, and means for moving said shutter means from said normally closed to said open position and adapted to operate responsive to placement of the container means into operative disposition with utilization means for said disc.

15. Magnetic recording apparatus comprising means forming a playing deck, a rotary drive member projecting upwardly from the deck, a magnetic transducer adapted to cooperate with a magnetic record disc supported on said drive member for transducing electrical signals with respect to said disc, switch means operatively coupled to the transducer for disabling same in the recording mode of operation of the transducer, and an information storage cartridge comprising container means forming an envelope enclosure, a rotatable recording disc within the enclosure, said container means includng an access opening adapted to accommodate transducer cooperation with a recording surface portion of the disc, and a readily removable control element carried by said container means and adapted when said cartridge is disposed in an otherwise operative transducing relation upon the playing deck to cooperate with said switch means to operate same by virtue of its presence or absence at a predetermined disposition relative to said enclosure.

16. In an information storage cartridge adapted for use with utilization means having a transducer disposed in a stream of filtered air exhausting to the outside surroundings, a cartridge construction comprising container means forming an envelope, a rotatable information storage disc within the envelope, said disc having an information record portion and a hub portion, the hub portion being formed and adapted to be engaged by a rotary drive member of the utilization means, openings in said container means on opposite sides of the disc at least one of which registers with said hub portion so that at least said one opening is adapted to pass a rotary drive member of the utilization means into driving relation with said hub portion, a flexible dust seal element around each of said openings and disposed betwen an associated side of the disc and the adjacent inner surface of the envelope for normally forming a closure therebetween, at least that one of said seals which is disposed to the opposite side of the disc from that side confronting said one opening being movable between projected and collapsed positions to respectively form in said positions a closure and an exhaust passage between the disc and an inner surface of said envelope, said one seal including a portion adapted to be depressed to collapse the seal to form said passage, an access passage formed through said envelope and disposed and adapted to register with and confine the stream of filtered air and accommodate transducer cooperation with said information record portion of said disc, shutter means movable between a normally closed and an open position respectively covering and uncovering the opening so as to be adapted to be moved to expose a recording surface portion of said disc to permit transducing operations therethrough, and means for moving said shutter means from said normally closed to said open position and adapted to operate responsive to placement of the container means into operative disposition with utilization means for said disc.

References Cited

UNITED STATES PATENTS

| | | | |
|---|---|---|---|
| 3,304,544 | 2/1967 | Johnson et al. ------ | 340—174.1 |
| 3,229,268 | 1/1966 | Solyst ------------ | 340—174.1 |

BERNARD KONICK, *Primary Examiner.*

A. I. NEUSTADT, *Assistant Examiner.*

U.S. Cl. X.R.

179—100.2; 274—4, 41.4